United States Patent
Nehring

(10) Patent No.: US 6,705,853 B1
(45) Date of Patent: Mar. 16, 2004

(54) SIX STATION ROTARY THERMOFORMING MACHINE

(75) Inventor: Gary J. Nehring, Grand Blanc, MI (US)

(73) Assignee: Durakon Industries, Inc., Lapeer, MI (US)

(*) Notice: Subject to any disclaimer, the term of this patent is extended or adjusted under 35 U.S.C. 154(b) by 297 days.

(21) Appl. No.: 09/693,654

(22) Filed: Oct. 20, 2000

(51) Int. Cl.[7] .......................... B29C 51/12; B29C 51/42
(52) U.S. Cl. .................. 425/504; 425/508; 425/388
(58) Field of Search ........................... 425/383, 388, 425/389, 504, 508, 515; 264/248

(56) References Cited

U.S. PATENT DOCUMENTS

| | | | | |
|---|---|---|---|---|
| 3,925,140 A | * | 12/1975 | Brown | 425/383 |
| 4,447,200 A | * | 5/1984 | Weisner et al. | 425/388 |
| 4,571,320 A | * | 2/1986 | Walker | 425/397 |
| 4,608,009 A | | 8/1986 | Whiteside et al. | 425/590 |
| 4,636,348 A | | 1/1987 | Whiteside | 264/544 |
| 4,666,544 A | | 5/1987 | Whiteside et al. | 156/212 |
| 4,676,938 A | | 6/1987 | Karklin et al. | 425/112 |
| 4,769,106 A | | 9/1988 | Busching | 156/497 |
| 5,002,479 A | | 3/1991 | Brown et al. | 425/398 |
| 5,167,969 A | | 12/1992 | DeMaio, Jr. et al. | 425/388 |
| 5,225,213 A | | 7/1993 | Brown et al. | 425/292 |
| 5,620,715 A | | 4/1997 | Hart et al. | 425/143 |
| 5,658,523 A | * | 8/1997 | Shuert | 425/388 |
| 5,773,050 A | | 6/1998 | Wohlrab | 425/589 |
| 5,814,185 A | * | 9/1998 | Chun et al. | 425/394 |
| 5,975,879 A | | 11/1999 | Dresen et al. | 425/504 |
| 6,086,354 A | | 7/2000 | Dresen et al. | 425/504 |
| 6,294,114 B1 | * | 9/2001 | Muirhead | 264/545 |
| 6,379,606 B1 | * | 4/2002 | Chun et al. | 425/503 |

* cited by examiner

*Primary Examiner*—Robert Davis
*Assistant Examiner*—Thu Khanh T. Nguyen
(74) *Attorney, Agent, or Firm*—Brinks Hofer Gilson & Lione

(57) ABSTRACT

A six station rotary thermoforming machine includes a first loading station for first or upper panels, a second loading station for second or lower panels, two adjacent stations for heating the panels, a thermoforming station, an unloading station and a carousel for transferring thermoformable panels between such stations. The carousel includes a rotating circular frame which is driven by a centrally disposed drive assembly. The circular frame carries and supports six carrier assemblies having peripheral clamping members which receive panels of thermoformable material and rotates to sequentially move them from one station to the next. The two heating stations each include upper and lower radiant heaters. The thermoforming station includes a pair of opposed, vertically translatable platens which receive respective molds which engage and form the panels and may include a device for loading performs or inserts. The number of stations and the residence time of the plastic panels to be formed in each optimizes production output of twin sheet thermoformed products.

22 Claims, 16 Drawing Sheets

SIX STATION ROTARY THERMOFORMING MACHINE

BACKGROUND OF THE INVENTION

The invention relates generally to multiple station forming machines for thermoformable panels and more particularly to a six station thermoforming machine having loading, heating, forming and unloading stations and a carousel for transporting thermoformable panels between such stations.

The technology of relatively large scale thermoforming of thermoplastic or thermosetting sheets has developed in response to continuing demands from various industries such as the automotive industry. Thermoformed panels are used as tonneau covers, floor panels, body panels, sound insulating partitions and the like in both motor vehicles and a wide variety of other products where relatively rigid, weather resistant, lightweight, tough, strong and non-rusting components are required.

The demand for such products has encouraged research and development of processes and manufacturing machines. One such machine is disclosed in U.S. Pat. No. 4,769,106, which is directed to an apparatus which assembles a pair of plastic sheets into a unitary device by welding about the peripheries of the sheets. The device includes a welding station, a cutting station and a conveying apparatus which transports the plastic sheets through the assembling stations. The conveying apparatus includes a moving carriage with grasping devices which engage the periphery of the plastic sheets. A cam arrangement operates to move the grasping devices from a first position in which they engage the plastic sheets to a second position in which the plastic sheets are released. Due to the linear construction of this machine and the use of a single device at each station, the overall maximum speed of the machine is limited by the maximum speed of the slowest station. This situation, which is a common manufacturing problem, adversely effects production efficiency.

A rotary thermoforming machine is disclosed in U.S. Pat. No. 4,555,377. In this machine, a rotating, substantially circular frame includes four sub frames having peripheral clamping members, which may be engaged or released to retain or release plastic sheets. The frame which carries the four carriages rotates and indexes them from a loading station through two heating stations to a mold station where the thermoformed product is produced.

A review of the foregoing two patent references as well as other references and prior art devices reveals that certain design choices and machine configurations limit production speed and interfere with both production throughput and product quality. The present invention is directed to an improvement in such thermoforming machines which address the foregoing and other shortcomings of the prior art.

SUMMARY OF THE INVENTION

A six station rotary thermoforming machine includes a carousel and a first loading station for first or upper panels, a second loading station for second or lower panels, two adjacent stations for heating the panels, a thermoforming station and an unloading station. The carousel includes a rotating circular frame which is driven by a centrally disposed drive assembly. The frame carries and supports six carrier frame assemblies having peripheral clamping members which receive panels of thermoformable material and rotate to sequentially move them from one station to the next. The two heating stations each include upper and lower radiant heaters. The thermoforming station includes a pair of opposed, vertically translatable platens which receive respective molds which engage and form the panels. Adjacent the thermoforming station is an insert or preform loader which places a preform into the mold during fabrication of the product. The number of stations and the residence time of the plastic panels to be formed in each optimizes production output of twin sheet thermoformed products.

Thus is an object of the present invention to provide a six station rotary thermoforming machine.

It is a further object of the present invention to provide a six station rotary thermoforming machine having two heating stations and one forming station.

It is a still further object of the present invention to provide a six station rotary thermoforming machine having two loading stations and one thermoforming station.

It is a still further object of the present invention to provide a six station rotary thermoforming machine having a carousel containing six panel engaging carrier frame assemblies and a centrally disposed drive unit.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Apparatus

Figure 1:
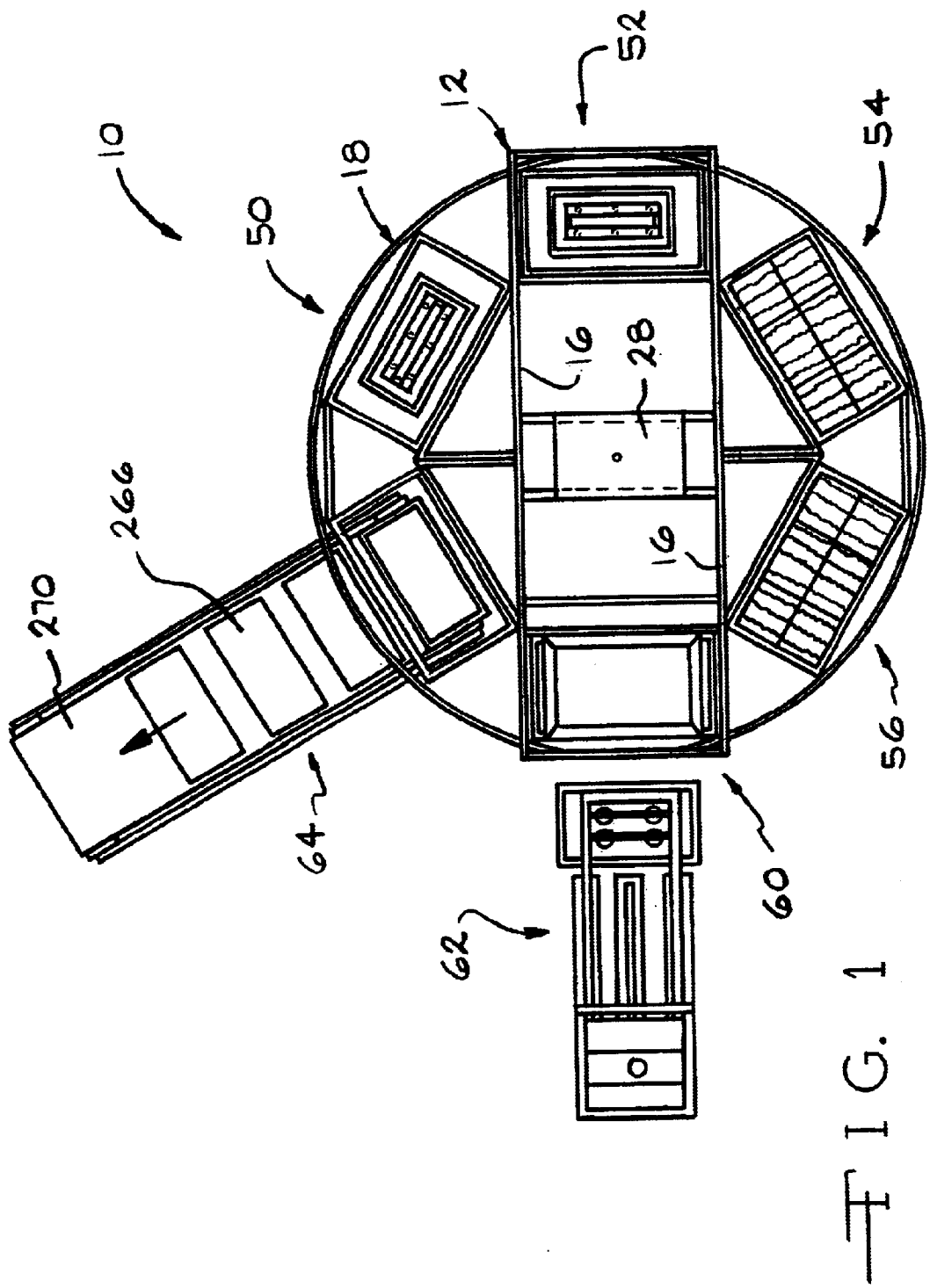
FIG. 1 is a schematic, top plan view of a six station rotary thermoforming machine according to the present invention.
Figure 2:
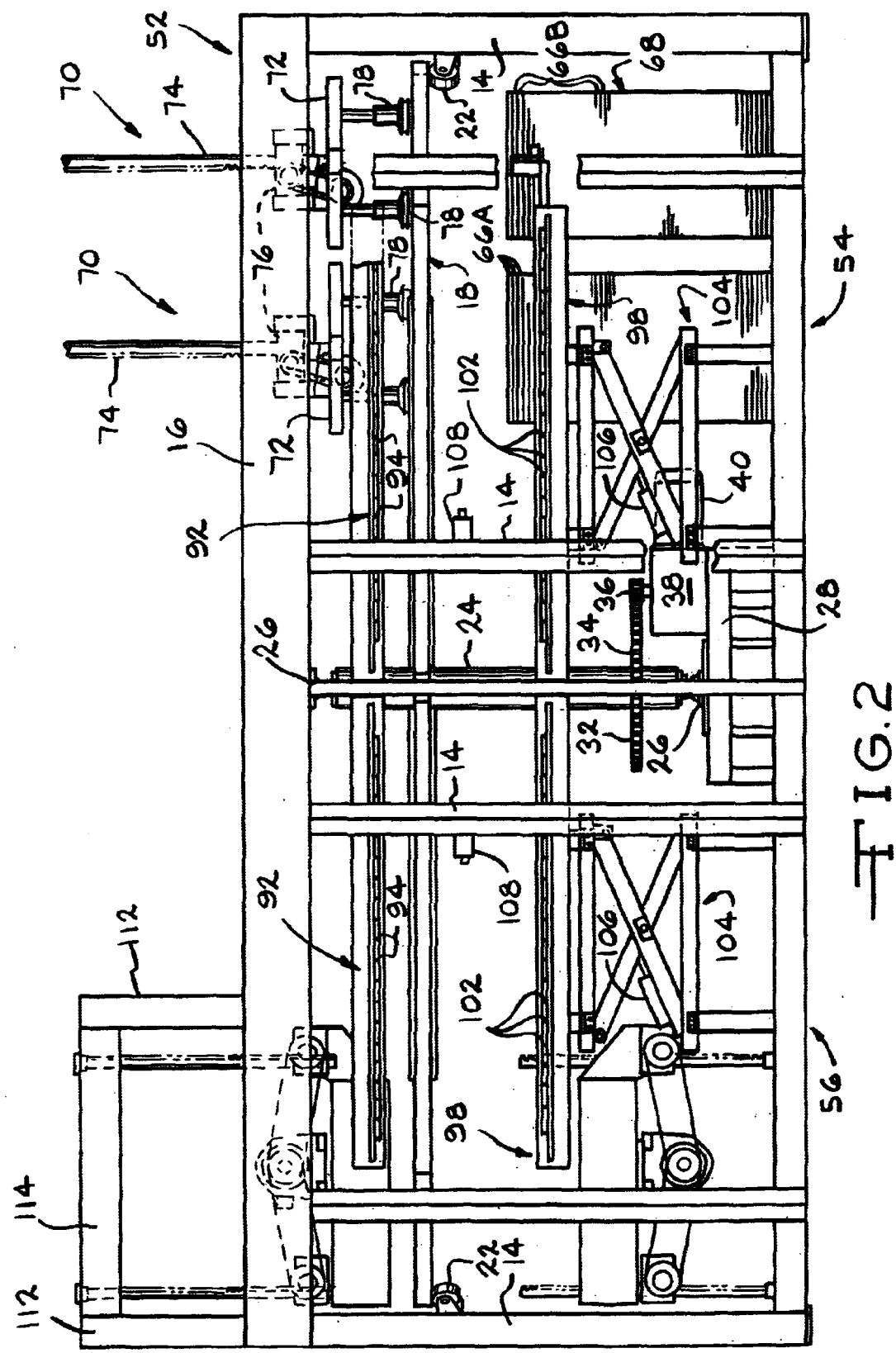
FIG. 2 is a side, elevational view of a six station rotary thermoforming machine according to the present Invention illustrating the heating stations.
Figure 3:
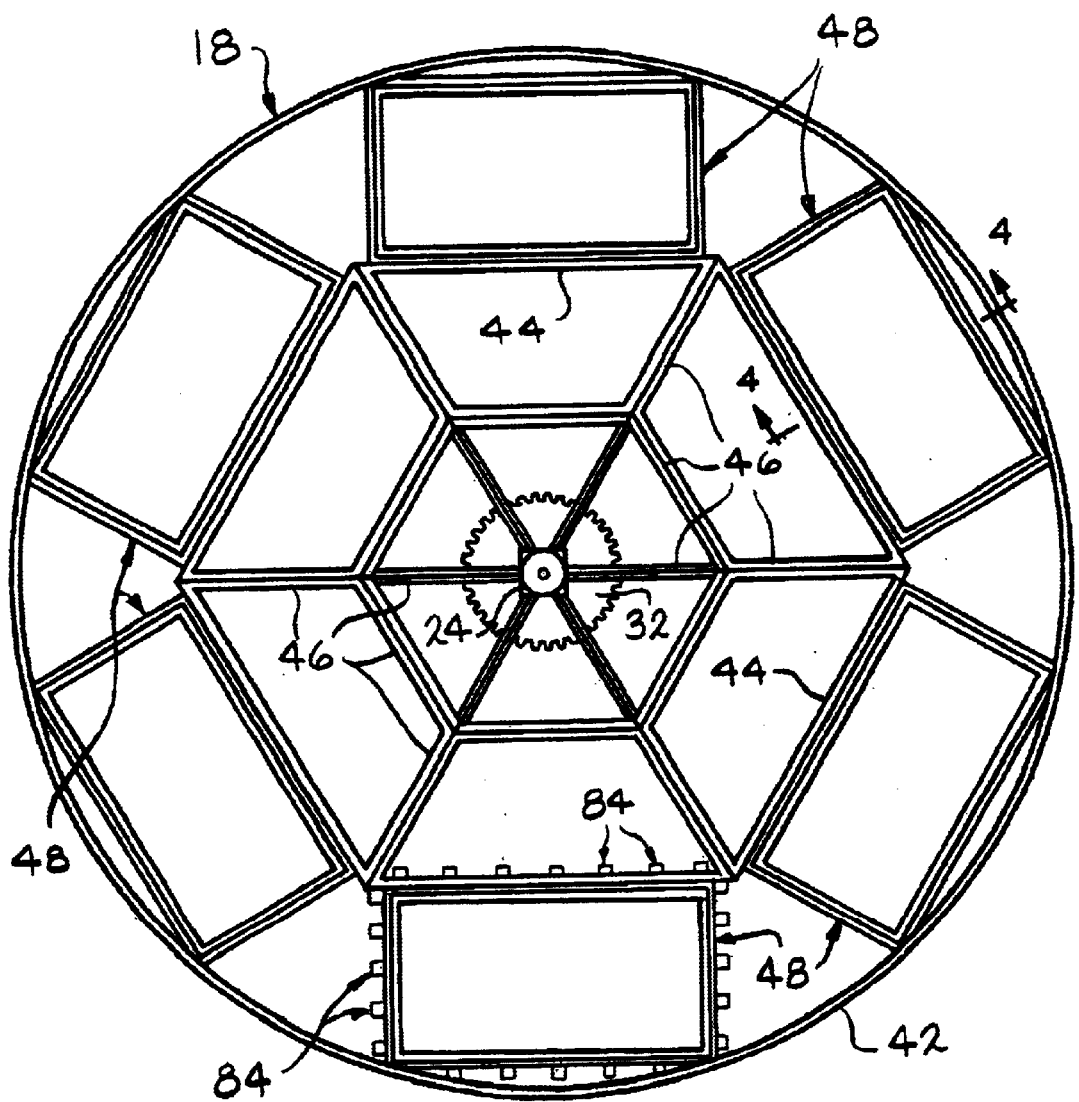
FIG. 3, is a top plan view of a carousel assembly containing six panel receiving carrier frames in a six station rotary thermoforming machine according to the present invention.

Referring now to FIGS. 1, 2 and 3, a rotary thermoforming machine according to the present invention is illustrated and generally designated by the reference number 10. The rotary thermoforming machine 10 includes a rigid superstructure or frame 12 having a plurality of vertical supports 14 and a pair of horizontal rails or beams 16. The rotary thermoforming machine 10 also includes a rotating, generally circular frame or carousel assembly 18 which is supported about its periphery on a plurality of rollers 22 secured to the vertical supports 14. The carousel assembly 18 is also supported by a center column 24 which is rotatably received within and supported by a suitable bearings 26 attached to cross members 28 secured to the frame 12. The center column 24 includes a large driven chain sprocket 32 which receives a chain 34 which also engages a small chain drive sprocket 36 driven by the output of a speed reduction unit 38. The speed reduction unit 38 is, in turn, driven by an electric motor 40. In operation, the electric motor 40 is intermittently activated such that the carousel assembly 18 indexes, that is, rotates in 60° increments or arcs, ceases rotation or dwells for a fixed period of time while certain process steps are performed and then repeats the indexed rotation cycle. Alternatively, a clutch (not illustrated) disposed in operable relationship with the speed reduction unit 38 may be engaged and disengaged to effect such intermittent rotation of the carousel assembly 18. The carousel assembly 18 includes an outer circular box beam frame 42 and an inner hexagonal box beam frame 44 and suitable chordal and radial braces 46. The outer circular frame 42 and the inner hexagonal frame 44 support and receive a plurality, preferably six, carrier frame assemblies 48.

The rotary thermoforming machine 10 also includes a plurality of operating or process stations disposed generally concentrically about the center support column 24 of the carousel assembly 18. There is a first loading station 50 at which, as will be described subsequently, a first or upper panel is loaded into a carrier frame assembly 48, a second loading station 52 wherein in a second or lower panel is loaded onto another carrier frame assembly 48, a first heating station 54 which provides radiant heat to an adjacent panel in the carousel assembly 18, and a second heating station 56 which likewise provides heat to a panel in the carousel assembly 18, a molding station 60 wherein the product fabricated in the rotary thermoforming machine 10 is assembled. A robot loading assembly 62 cooperates with the molding station 60 to supply preforms or inserts into the products fabricated therein. Finally, the rotary thermoforming machine 10 includes an unloading station 64 which removes finished product from the thermoforming machine 10 and specifically the carrier frame assemblies 48 of the carousel assembly 18.

Figure 4:
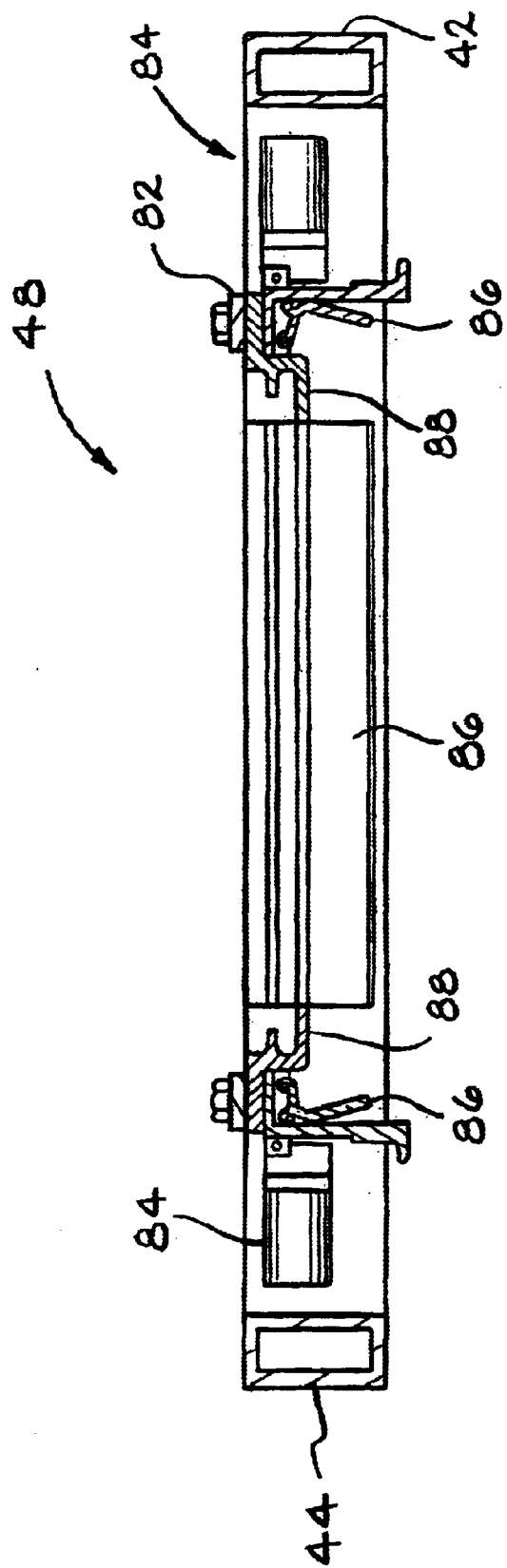
FIG. 4 is a full, sectional view of one of the carrier frame assemblies on the carousel assembly having clamps in their open or disengaged positions taken along line 4—4 of FIG. 3.

Turning now to FIGS. 2, 3 and 4, the second loading station 52 will now be described. At the outset, it should be understood that the first loading station 50 loads only first or upper thermoformable sheets or panels 66A into the carousel assembly 18 and that the second loading station 52 loads only second or lower thermoformable sheets or panels 66B into the carousel assembly 18. The thermoformable sheets or panels 66A and 66B are preferably high density polyethylene (HDPE) but may be any similar rugged and durable thermoplastic or thermosetting material. The first loading station 50 and the second loading station 52 are disposed adjacent one another in the rotary thermoforming machine 10 and are identical in operation and design. Accordingly, only the second loading station 52, illustrated in FIG. 2 will be described, it being understood that the following description relating thereto applies fully and accurately to the first loading station 50.

The second loading station 52 is provided with a plurality of second or lower thermoformable panels 66B disposed in an aligned, vertical stack 68. A loading assembly 70 transfers individual lower thermoformable panels 66B from the stack 68 to the carrier frame assemblies 48. The loading assembly 70 includes a moveable frame 72 attached to a vertical jack or lead screw 74 which is vertically raised and lowered by an associated drive assembly 76. Pneumatic cylinders and analogous bi-directional linear translating devices are all suitable alternative motive devices. Depending from the frame 72 are a plurality of suction (vacuum) lift cups 78. The suction lift cups 78 are in fluid communication with a controllable vacuum source (not illustrated). As the frame 72 is lowered through action of the drive assembly 76 and the jack or lead screw 74, the suction lift cups 78 engage the uppermost lower thermoformable panel 66B on the stack 68 and, when a vacuum is present in the suction lift cups 78, the lower thermoformable panel 66B is engaged and lifted. The lower thermoformable panel 66B may be readily released from the suction lift cups 78 by terminating the vacuum therein in accordance with conventional practice.

Figure 5:
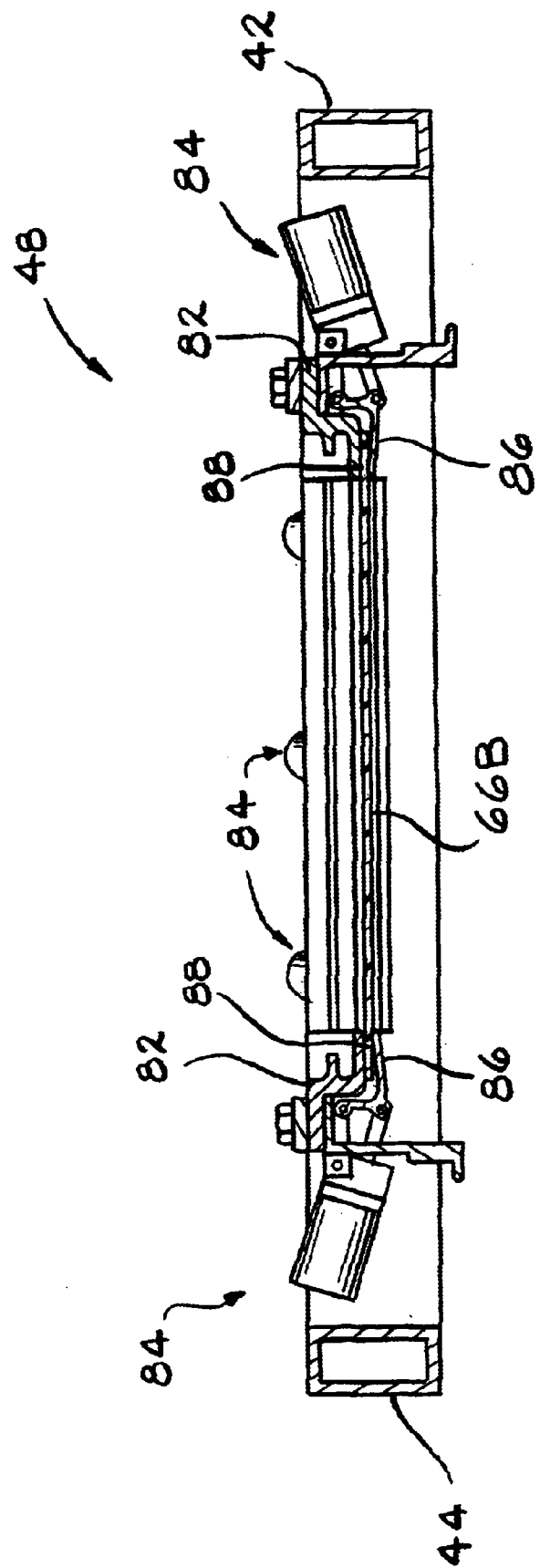
FIG. 5 is a full, sectional view of one of the carrier frame assemblies on the carousel assembly having clamps in their locked or engaged positions taken along line 4—4 of FIG. 3.

Turning now to FIGS. 2, 3, 4 and 5, the loading assembly 70 individually transfers one of the lower thermoformable panels 66B to one of the carrier frame assemblies 48. Each of the frame assemblies 48 includes a peripheral rectangular mounting frame 82 upon which are pivotally mounted a plurality of air piston and cylinder assemblies 84. The pistons of the assemblies 84 activate an elongate pivoting clamp 86 which pivots toward an inner rectangular frame surface 88 which extends about the interior of the frame 82. Generally speaking, the configuration of the inner frame surface 88 defines a rectangular shape slightly larger than the rectangular shape of the thermoformable panels 66A and 66B. When the loading assembly 70 lifts one of the lower thermformable panels 66B from the stack 68, one of the carrier frame assemblies 48 is accurately aligned thereover and the lower thermoformable panel 66B is raised until it engages the inner rectangular frame surface 88. At this time, the piston and cylinder assemblies 84 are activated and the pivoting clamps 86 engage and retain the lower thermoformable panel 66B on the surface 88 as illustrated in FIG. 5. After the first loading station 50 has loaded the first or upper thermoformable panel 66A into one of the carrier frame assemblies 48 and the second loading station 52 has loaded a second or lower thermoformable panel 66B into an adjacent one of the carrier frame assemblies 48, the electric motor 40 is activated and the carousel assembly is rotated 60°.

It should be appreciated that by utilizing separate loading stations 50 and 52 for the upper and lower thermoformable panels 66A and 66B, specific exterior surface treatments or features such as designs, graining, logos and the like may be readily located on the outer surfaces of a product while alleviating the necessity of providing such surface treatment or logo on both surfaces of the thermoformable panels 66A and 66B. Alternatively, it may be desirable that the graining or other surface treatment be on the Inner surface in order to aid bonding or adhesion of produce elements. In either event, because the machine 10 utilizes two separate stacks 68 of thermoformable panels 66A and 66B and the locations of the thermoformable panels 66A and 66B in the carrier frame assemblies 48 are effectively tracked, the thermoformable panels 66A loaded at the first station 50 with such surface treatment or logo facing up or down are always utilized as an upper panel in the product such that any surface treatment or logo Is located as desired, i.e., either on the exposed, upper face of the product or the interior surface of the upper panel 66A and the thermoformable panels 66B loaded at the second station 52 with such surface treatment or logo facing down or up are always utilized as the bottom panel of the product such that any logo or desired surface treatment is located either on the visible, i.e., exposed, lower face of the product or the interior surface of the lower panel.

Referring again to FIGS. 1 and 2, the first heating station 54 and the second heating station 56 will next be described. It should be understood that the heating stations 54 and 56 are identical and that incorporation of two heating stations, among other things, improves process cycle time. Inasmuch as the two heating stations 54 and 56 are substantially identical in structure, only the first heating station 54 will be described, it being understood that generally only operational and process differences such as electrical input or heating element to product spacing will vary between the two stations 54 and 56.

The first heating station 54 includes a first or upper radiant heating assembly 92 having a plurality of electrical resistance heating elements 94 disposed in a conventional, spaced-apart array. Preferably, the upper heating assembly 92 is disposed several inches above the carousel assembly 18 and is relatively fixedly secured to the horizontal rails or beams 16 of the frame 12. By "relatively fixedly secured," it is meant that while the radiant heating assembly 92 is not mounted in a fashion which readily permits height adjustment relative to the carousel assembly 18, it may, nevertheless, be raised or lowered relative thereto, if necessary, and its mounting configuration should not preclude such adjustment.

A second or lower radiant heating assembly 98 is disposed vertically beneath the upper heating assembly 92 and beneath the carousel assembly 18. The second or lower heating radiant assembly 98 likewise includes a plurality of electrical resistance heating elements 102 in a spaced-apart array. The second or lower radiant heating assembly 98, is, however, readily adjustable and is supported upon a scissor lift assembly 104 having a conventional pantograph type configuration and an actuator such as a hydraulic piston and cylinder assembly 106 or an electrically driven motor and lead screw which, when activated, raises and lowers the second or lower radiant heating assembly 98 as will be readily appreciated. Accordingly, the amount of heat provided by both radiation and convection from the second or lower heating assembly 98 to the thermoformable panels 66A and 66B retained in the frame assemblies 48 of the carousel assembly 18 may thus be readily adjusted in order to achieve proper heating and thus flexibility and formability of the panels 66A and 66B when they arrive at the thermoforming station 60.

The second heating station 56 is substantially identical to the first heating station 54 and thus includes an upper radiant heating assembly 92 having a plurality of electrical resistance heating elements 94 disposed in a spaced-apart array. The second heating station 56 also includes a second or lower radiant heating assembly 98 vertically aligned with the upper radiant heating assembly 92 and having a plurality of electrical resistance heating elements 102 in a spaced-apart array. The second radiant heating assembly 98 is likewise mounted upon a scissor lift assembly 104 which is driven by a hydraulic piston and cylinder assembly 106.

Optionally, photoelectric sag sensors 108 utilized in conjunction with a light source (not illustrated) may be disposed below the plane of the carousel assembly 18 adjacent both the first heating station 54 and the second heating station 56 in order to detect sag of the thermoformable panels 66A and 66B in each of the stations 54 and 56 as they are heated. Depending upon the selected vertical location of the sag sensors 108 above the lower heating assemblies 98, a signal from one of the sag sensors 108 indicating that it has sensed sag of one of the panels 66A or 66B may be utilized in various ways. For example, If the sag sensors 108 are relatively close to the plane of the carousel assembly 18 and the carrier frame assemblies 48, a sag signal may be used as an operational signal indicating that the thermoformable panel 66A or 66B is sufficiently heated and flexible and that the carousel assembly 18 may be indexed and that thermoforming may proceed. If the sag signal is utilized to index the carousel assembly 18, it is necessary, of course, that the heating cycle at an individual heating station 54 or 56 generally occupy more time than that of the steps of the thermoforming cycle such that when sag is detected, the carousel assembly 18 can be promptly indexed. Alternatively, when sag is sensed, electrical energy to the electrical heating elements 94 and 102 may be limited or reduced to maintain the temperature of, but not further heat, the thermoformable panels 66A and 66B. As a further alternative, if the sag sensors 108 are disposed relatively proximate the second or lower radiant heating assemblies 98, sag sensing may be utilized to trip an alarm or provide a control signal alerting an operator that further sag of the thermoformable panels 66A and 66B may result in contact between the panels 66A and 66B and the electrical resistance heating elements 102. As a final alternative, multiple sag sensors 108 may be utilized at multiple vertical locations to provide both operating signals and limit or alarm signals, if desired.

Figure 6:
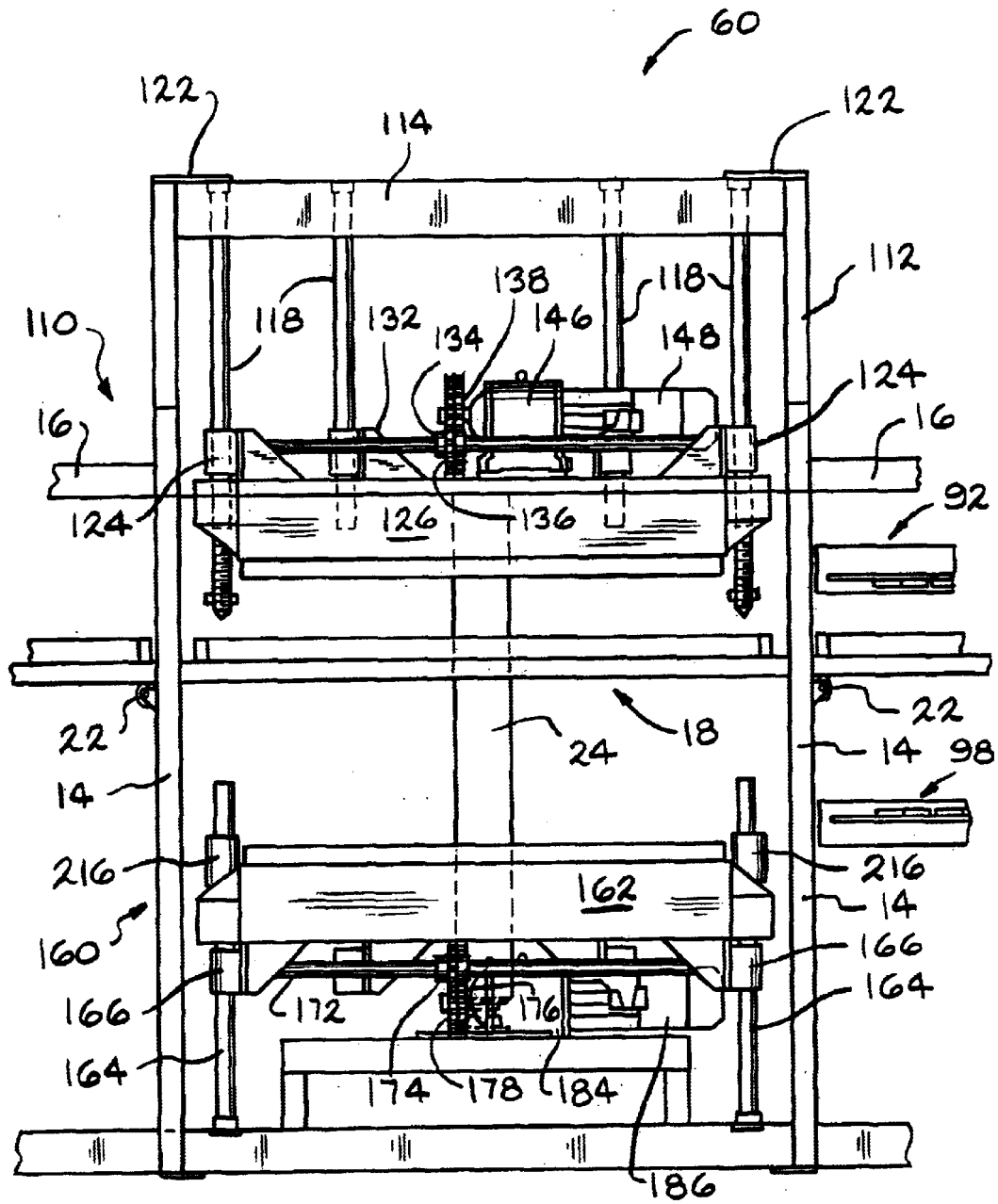
FIG. 6 is a front, elevational view of the thermoforming station of a six station rotary thermoforming machine according to the present invention with platens in an open position.

Referring now to FIGS. 2, 6, 7 and 8, the thermoforming station 60 of the rotary thermoforming machine 10 according to the present invention will now be described. The thermoforming station 60 includes an upper mold assembly 110 located within and positioned by the vertical supports 14, the horizontal supports 16, upper frame members 112 and upper horizontal frame members 114. The upper mold assembly 110 includes a plurality of gear racks 118. The gear racks 118 are stationary, disposed vertically and depend from cantilever support plates 122, which, in turn, are attached to the horizontal frame members 114. The gear racks 118 are slidably received within bushings or journal bearings 124 secured to an upper platen 126. As illustrated in FIG. 6, preferably at least four of the gear racks 118 and associated journal bearings or bushings 124 are utilized with the upper platen 126.

Figure 7:
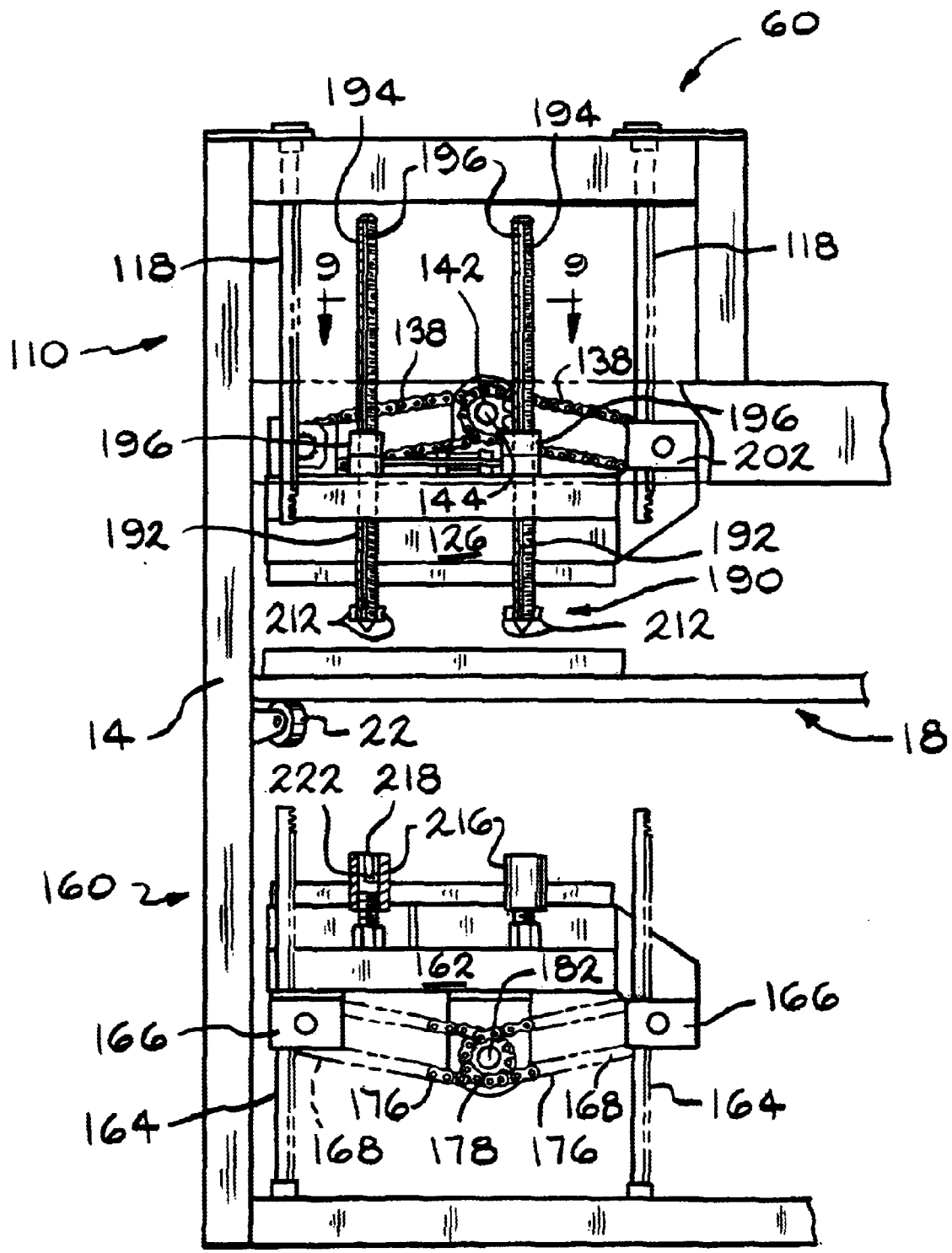
FIG. 7 is a side elevational view of the thermoforming, station illustrating a mechanism for translating platens of a six station rotary thermoforming machine according to the present invention.
Figure 8:
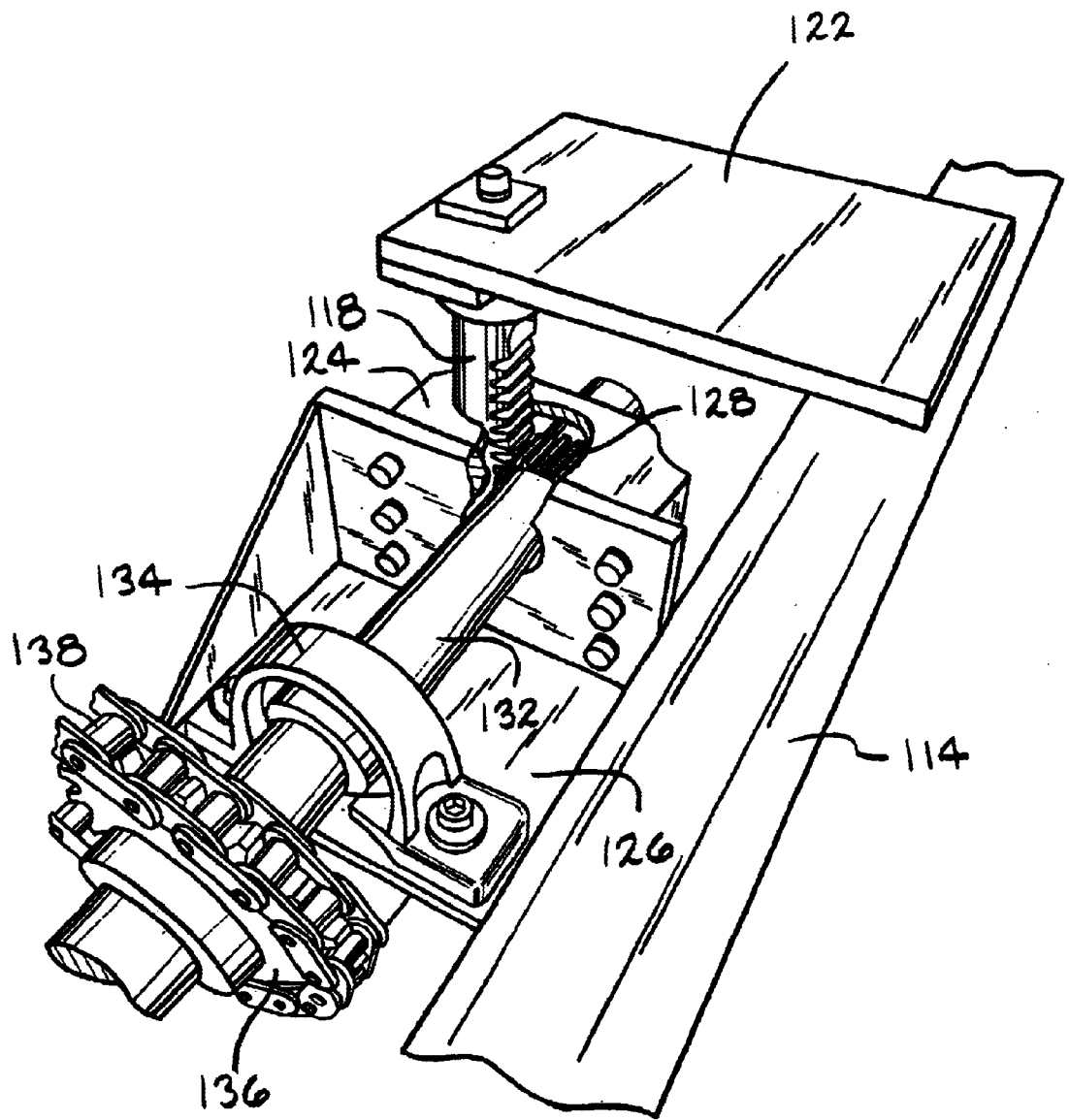
FIG. 8 is an enlarged, perspective view of a portion of the platen translating drive assembly of a six station rotary thermoforming machine according to the present invention.

As best illustrated in FIGS. 6, 7 and 8, each of the gear racks 118 is driven by a complementarily configured spur gear 128 which engage the gear rack 118 through a suitable opening in the journal bearing or bushing 124. Each of the spur gears 128 is, in turn, secured to one of a pair of transverse shafts 132 supported in suitable bearings such as pillow blocks 134. Secured to each of the shafts 132 is a driven chain sprocket 136. A pair of chains 138 engage a respective one of the driven chain sprockets 136 and in turn, engage one of a pair of chain drive sprockets 142 disposed on the output shaft 144 of a speed reduction assembly 146. The speed reduction assembly 146 is driven by a bi-directional electric motor 148 mounted upon the upper platen 126. As illustrated in FIGS. 6 and 7, it will be appreciated that the pair of chain drive sprockets 142 are disposed upon the output shaft 144 of the gear reduction assembly 146 and receive a respective one of the drive chains 138 which engage, at both the front and rear of the upper platen 126, the drive chain sprockets 136 disposed upon the transverse shafts 132. That is, the drive chains 138 extend to both the front and rear of the platen assembly 136 and drive the transverse shafts 132 and the spur gears 128 at each end which engage the vertically disposed gear racks 118. Thus, as the output shaft 144 and the chain drive sprockets 142 rotate, such motion is transmitted through the components just recited and elevates or lowers the upper platen 126, maintaining its horizontal disposition as illustrated in the drawing figures.

The thermoforming station 60 also includes a lower mold assembly 160 which is vertically aligned with and disposed below the upper mold assembly 110. The lower mold assembly 160 is similar in many respects to the upper mold assembly 110 and includes a similar configuration of mechanical components which raise and lower a lower platen 162. The lower mold assembly 160 thus includes a plurality, preferably four, gear racks 164 which are slidably received within bushings or journal bearings 166 secured to the lower platen 162. A like plurality of spur gears 168 disposed upon two transverse shafts 172 engage the gear racks 164 and, upon rotation, raise and lower the lower platen 162. The shafts 172 each include a chain drive sprocket 174 driven by a chain 176 which, in turn, is driven by a pair of chain sprockets 178 disposed upon the output shaft 182 of a gear reduction assembly 184. The gear reduction assembly 184 is, in turn, driven by a bi-directional electric motor 186. It will be appreciated that rotation of the electric motor 186 in a first direction will result in raising the lower platen 162 and vice versa. It will also be appreciated that both the bi-directional drive motors 148 and 186 as well as the associated mechanical linkages are capable of moving the upper platen 126 downward into, proximity with the top side of the carousel assembly 18, specifically the carrier frames 48, and the lower platen 162 upward into proximity with the underside of the carousel assembly 18, specifically the carrier frames 48.

Figure 9:
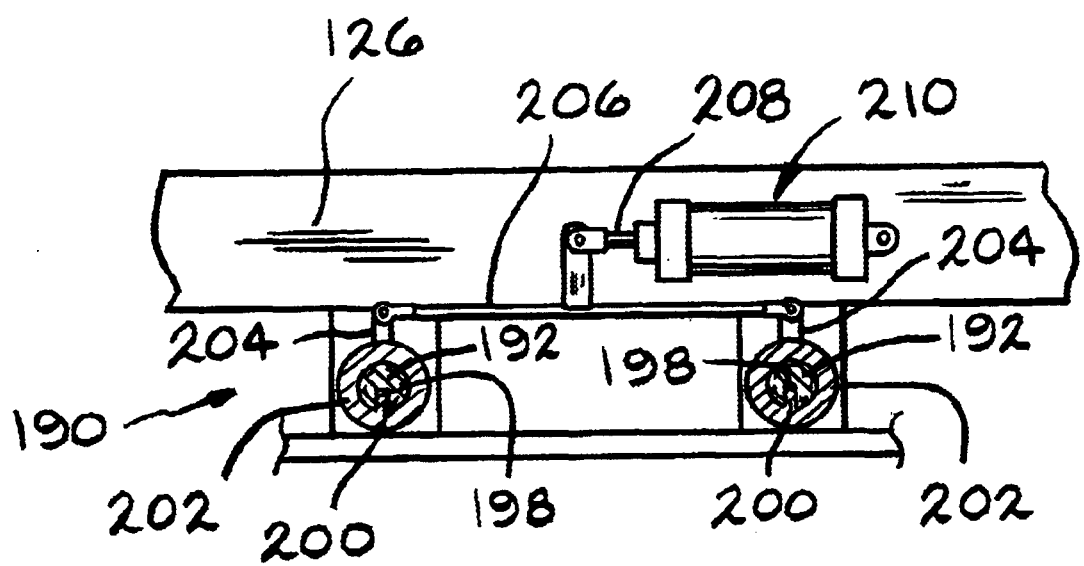
FIG. 9 is a fragmentary, sectional view of a bayonet drive assembly on the thermoforming station of a six station rotary thermoforming machine according to the present invention taken along line 9—9 of FIG. 7.

Referring now to FIGS. 6, 7 and 9, the thermoforming station 60 and specifically both the upper mold assembly 110 and the lower mold assembly 160 also include interlockable assemblies 190 which tightly and positively secure and retain the upper platen 126 and the lower platen 162 in a defined, proximate relationship during thermoforming activity. These assemblies 190 include a plurality of, preferably four, bayonets 192 which define elongate rods having male threads 194 disposed thereabout. The bayonets 192 are received within threaded locking collars 196 which may be rotated and secured to permit axial adjustment of the positions of the bayonets 192. Each of the bayonets 192 also includes an axial keyway 198 which each receives a key 200 or similar radially inwardly projecting component which extends from the inner wall of a drive collar 202. The drive collars 202 each also include radially oriented crank arms 204 which are pivotally, secured to a drive linkage 206. The drive linkage 206 is pivotally coupled to a piston shaft 208 of a double acting piston and cylinder assembly 210. Activation of the double acting piston and cylinder assembly 210 rotates the collars 202 and thus also rotates the bayonets 192 through an acute angle from a first angular position to a second angular position. Adjacent the lower termini of the bayonets 192 are a pair of opposed, radially extending bayonet pins 212.

The bayonets 192 and specifically the bayonet pins 212 are received within a respective one of a complementarily disposed like plurality of aligned bayonet sockets 216. Each of the bayonet sockets 216 includes a vertically, axially extending passageway 218 generally complementary to the bayonets 192. On the walls of the bayonet sockets 216 are suitably formed bayonet lock passages 222 which, in conventional bayonet operating fashion, receive the bayonet pins 212 axially and, upon rotation of the bayonets 192, lock the bayonet pins 212 and, thus the bayonets 192 into a fixed, axial position relative to the bayonet sockets 216. Such rotation of the bayonets 192 is, of course, accomplished by the piston and cylinder assemblies 210 illustrated in FIG. 9.

Figure 10:
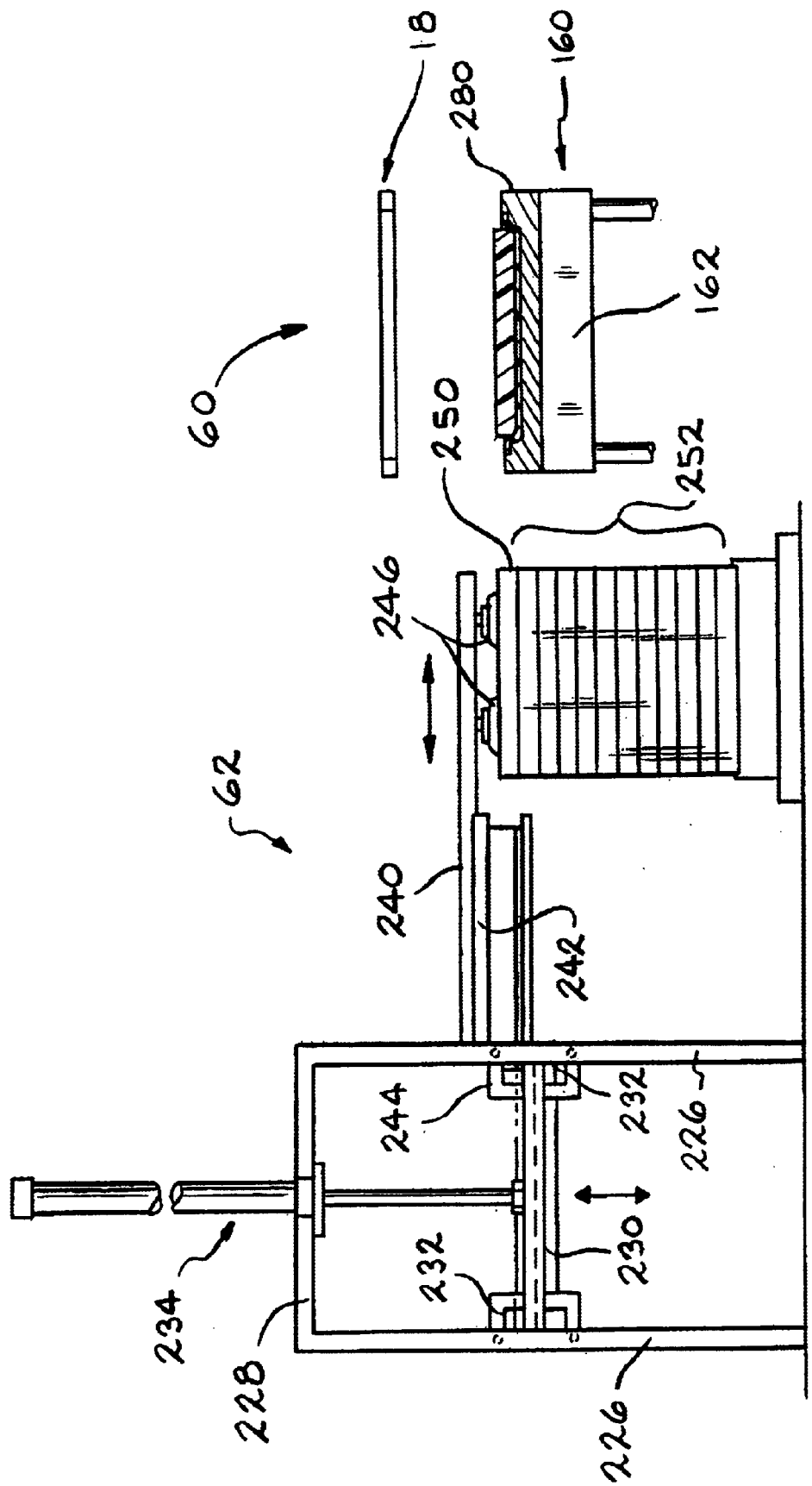
FIG. 10 is a side, elevational view of a core or insert loading mechanism of a six station rotary thermoforming machine according to the present invention.

Referring now to FIGS. 1 and 10, a mechanical or robot loading assembly 62 is disposed adjacent the thermoforming station 60. The mechanical or robot loading assembly 62 includes a plurality of vertical track or frame members 226 having horizontal cross members 228 which, with the vertical track or frame members 226, define a rectangular frame. A first carriage 230 translates vertically and bi-directionally along the vertical track or frame members 226 and includes friction reducing members such as guides or slides 232, a plurality of rollers or equivalent devices which both retain the carriage 230 in the frame and guide it vertically along the path defined thereby. The first carriage 230 is vertically, bi-directionally translated by a pneumatic piston and cylinder assembly 234 or other linear actuator such as a lead or ball screw device. The piston and cylinder assembly 234 or other device is preferably double acting and thus positively drives the first carriage 230 both up and down but may be single acting, its force being provided only to raise the first carriage 230, the lowering of the first carriage 230 accomplished by either gravity or a biasing spring which may be disposed within the piston and cylinder assembly 234.

Translating with the first carriage assembly 230 is a horizontally extensible arm or member 240 disposed upon a supporting slide 242 or similar friction reducing device such as a plurality of rollers. The horizontally extensible member 240 is driven by a bi-directional actuator 244 which may be, as described above, a double acting pneumatic cylinder or an electrically operated linear actuator, ball screw or the like. The extensible member 240 includes a plurality of, preferably two suction (vacuum) lift cups 246. The suction lift cups 246 and the extensible member 240, illustrated in a loading position in FIG. 10, engage an uppermost insert 250 in a vertically aligned stack of inserts 252 disposed adjacent the thermoforming station 60. At the appropriate time, a vacuum is supplied to the suction lift cups 246, the uppermost insert 250 is engaged, the actuators 234 and 244 are activated and the insert 250 is translated into the thermoforming station 60 as will be more fully described subsequently.

Figure 11:
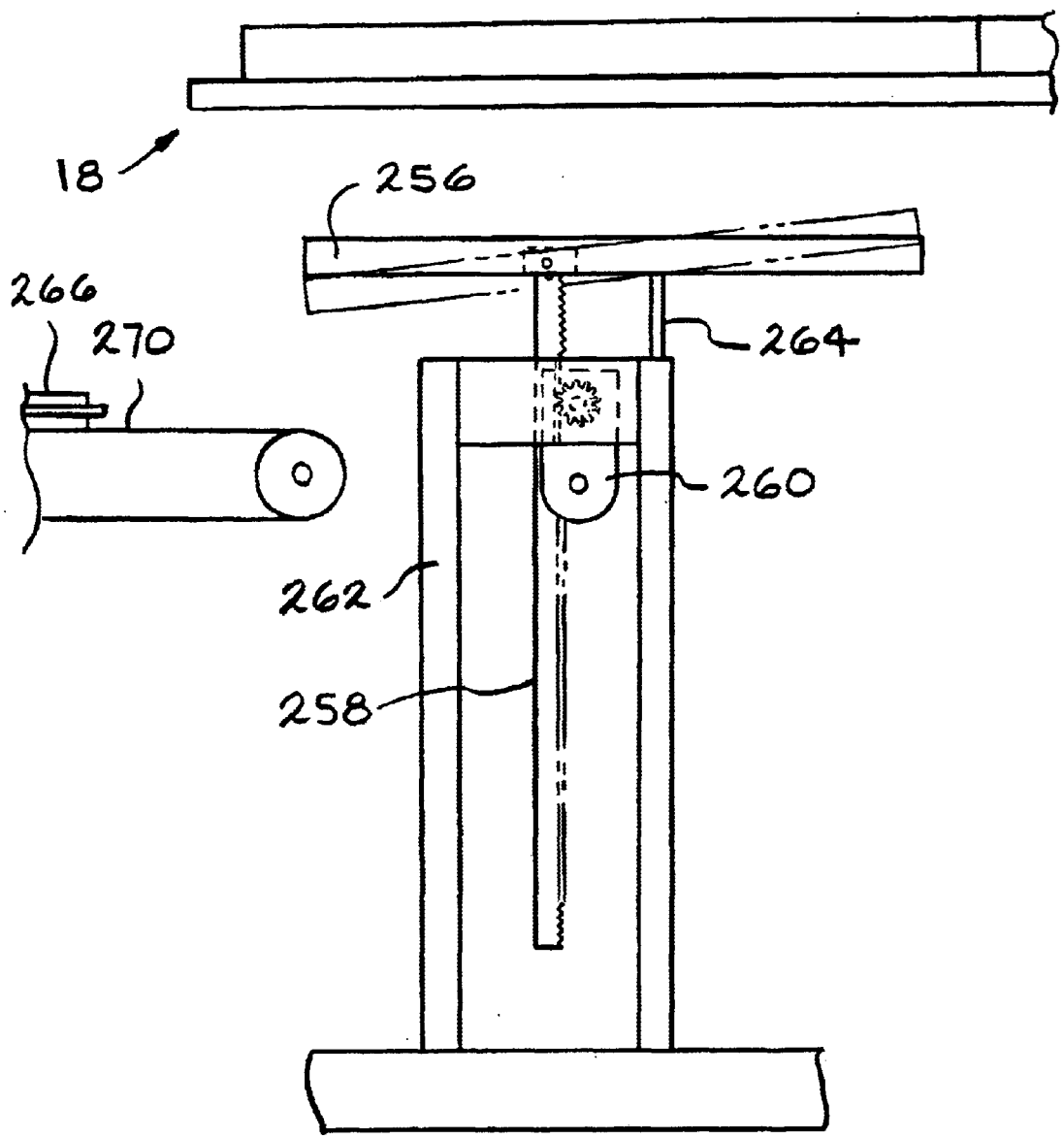
FIG. 11 is a side, elevational view of an unloading station of a six station rotary thermoforming machine according to the present invention.

Turning now to FIGS. 1 and 11, the unloading station 64 will be described. The unloading station 64 includes a tiltable table 256 which is generally vertically aligned with the carousel assembly 18, and specifically one of the carrier frame assemblies 48, when it is in one of its six, indexed positions. The table 256 is disposed upon one or a pair of vertically oriented, bi-directionally translatable members such as a gear rack 258. The gear rack 258 is bi-directionally translated by a drive, actuator 260 and both are supported by a rectangular frame assembly 262. A tilt stop 264 extends upwardly from the frame assembly 262 on the side of the gear racks 258 opposite the desired direction of discharge of product from the table 256. The drive actuator 260 may be selectively activated to raise the table 256 in timed relation to the other operations of the thermoforming machine 10 and engage a formed product 266 contained within one of the carrier frame assemblies 48 of the carousel assembly 18. The formed product 266 is released to the table 256, the actuator 260 is activated in the opposite direction and the table 256 lowers. As the bottom side of the table 256 engages the tilt stop 264, the table 256 tilts, discharging the formed product 266 onto an adjacent conveyor assembly 270.

Operation

Referring now to FIGS. 1, 2, 5, 12 and 13, operation of, and the processes performed by, the thermoforming machine 10 will now be described. All such operation is keyed in time to indexed or intermittent rotation of the carousel 18 and the carrier frame assemblies 48. Operation of the thermoforming machine 10 will thus be correspondingly described. Starting with a fully empty carousel assembly 18, i.e., six empty carrier frame assemblies 48, which are disposed in alignment with the six operating stations of the thermoforming machine 10 as illustrated in FIG. 1, the loading assembly 70 associated with the first loading station 50 loads a first or, upper thermoformable panel 66A into the carrier frame 48 and the piston and cylinder assemblies 84 are activated to engage the pivoting clamps 86 against the thermoformable panel 66A to retain the thermoformable panel 66A therein. At the same time or during the same cycle of the index cycle, the loading assembly 70 associated with the second loading station 52 undertakes and achieves a similar function by loading a second or lower thermoformable panel 66B into the carrier frame 48 currently disposed in a second position as illustrated in FIG. 5.

As noted previously, since the stacks 68 associated with the first loading station 50 and the second loading station 52 are separate and independent, the upper and lower thermoformable panels 66A and 66B, respectively, may include position specific surface treatment or indicia, i.e., graining or logos, for example, intended for the visible (exposed) upper or lower surface of the finished product 266 or the hidden (interior) panel surfaces and the thermoforming machine 10 handles these panels 66A and 66B in a manner which ensures that the surface treatment is located as desired in the formed product 266. The electric motor 40 may then be activated to index the carousel assembly 18 another 60° such that each carrier frame 48 moves clockwise from one station to the next (adjacent) station. At this time, the lower thermoformable panel 66B resides in the first heating station 54. After a dwell time determined for example, by the time consumed by operation of the thermoforming station 60 or first stage heating of the panel 66B in the first heating station 54, the electric motor 40 is again activated and the carousel assembly 18 again indexes 60°. Now the lower thermoformable panel 66B resides in the second heating station 56, the top thermoformable panel 66A resides in the first heating station 54 and the two carrier frames 48 resident in the first loading station 50 and the second loading station 52 are empty and may be loaded as previously described.

Figure 12:
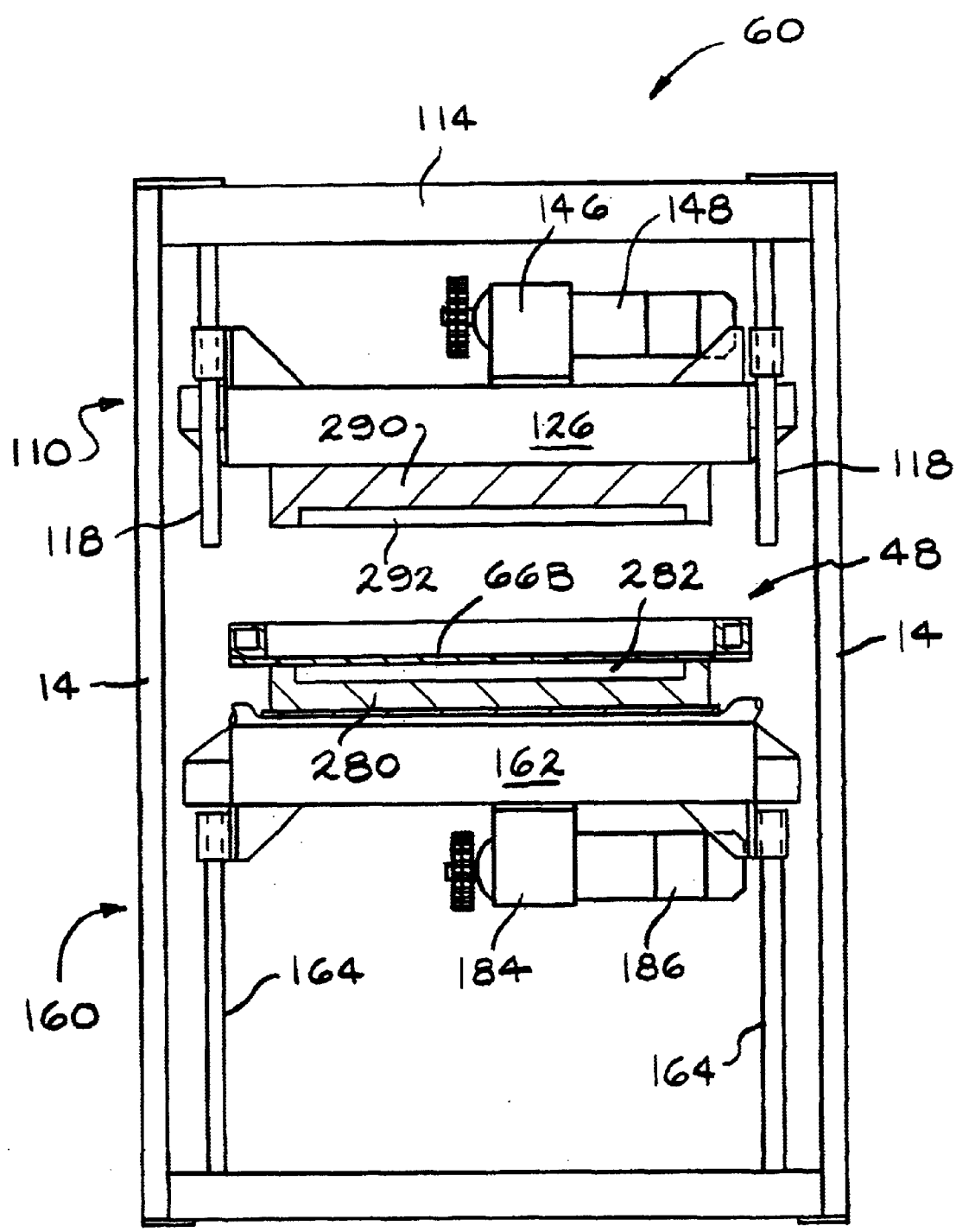
FIG. 12 is a front, elevational view of a thermoforming station of six station rotary thermoforming machine according to the present invention with a bottom panel loaded onto a lower mold section.
Figure 13:
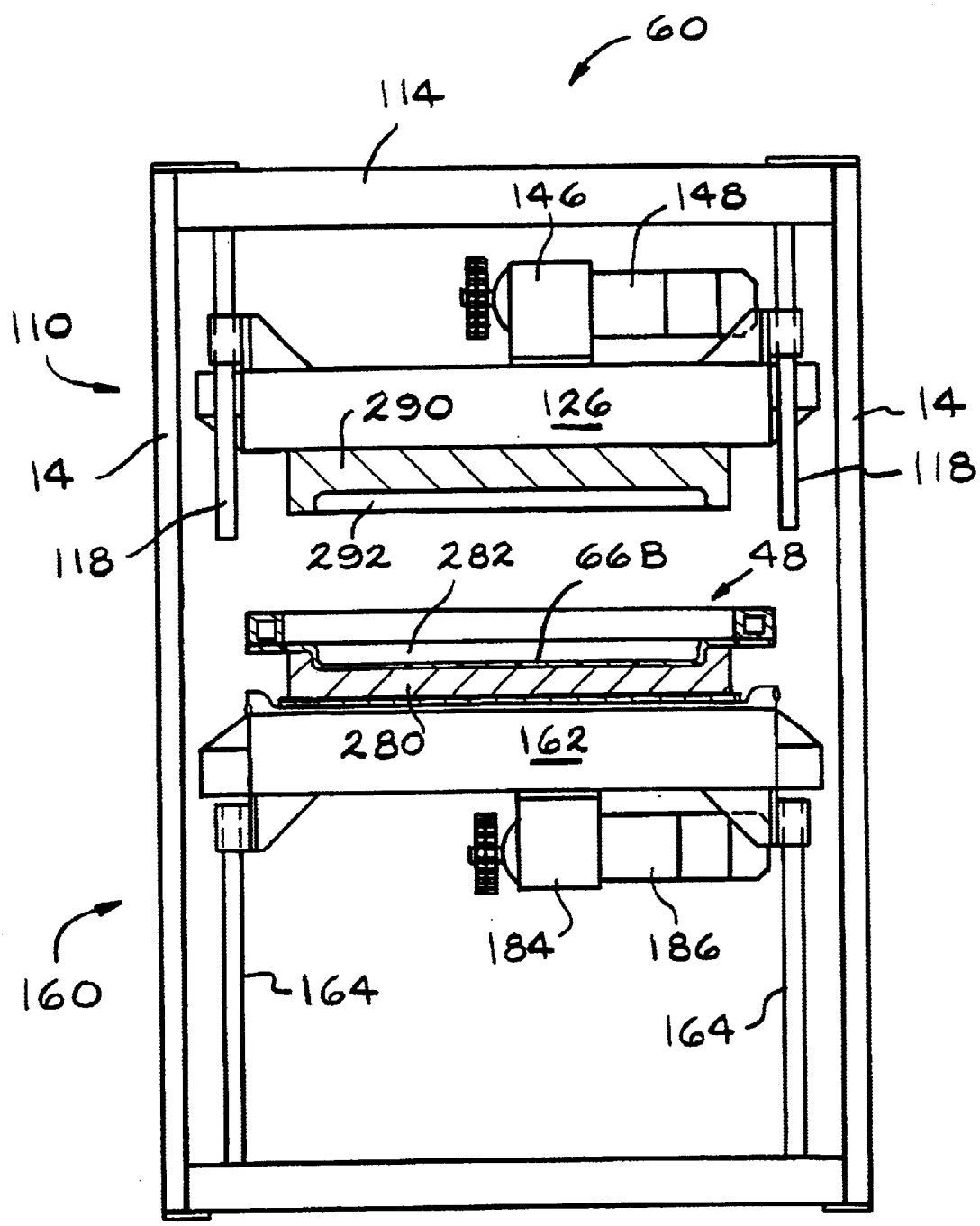
FIG. 13 is a front, elevational view of the thermoforming station of six station rotary thermoforming machine according to the present invention with a bottom panel formed in the lower mold section.

When the lower thermoformable panel 66B has been heated sufficiently as either determined by elapse of a predetermined time period or indicated by the sag sensors 108, the carousel assembly 18 is again indexed and rotated 60°, the lower thermoformable panel 66B is disposed and aligned with the thermoforming station 60 directly over a lower vacuum mold 280 as illustrated in FIG. 12. At this time, the electric motor 186 is activated to raise the lower platen 162 and a lower mold 280 into contact with the lower surface of the thermoformable panel 66B residing in the carrier frame 48 currently disposed within the thermoforming station 60. A vacuum is drawn within a lower mold cavity 282 of the lower mold 280 according to conventional practice and, as illustrated in FIG. 13, the thermoformable panel 66B takes the shape of the lower mold cavity 282. At this time, the piston and cylinder assemblies 84 are deactivated and the pivoting clamps 86 release the lower thermoformable panel 66B.

Figure 14:
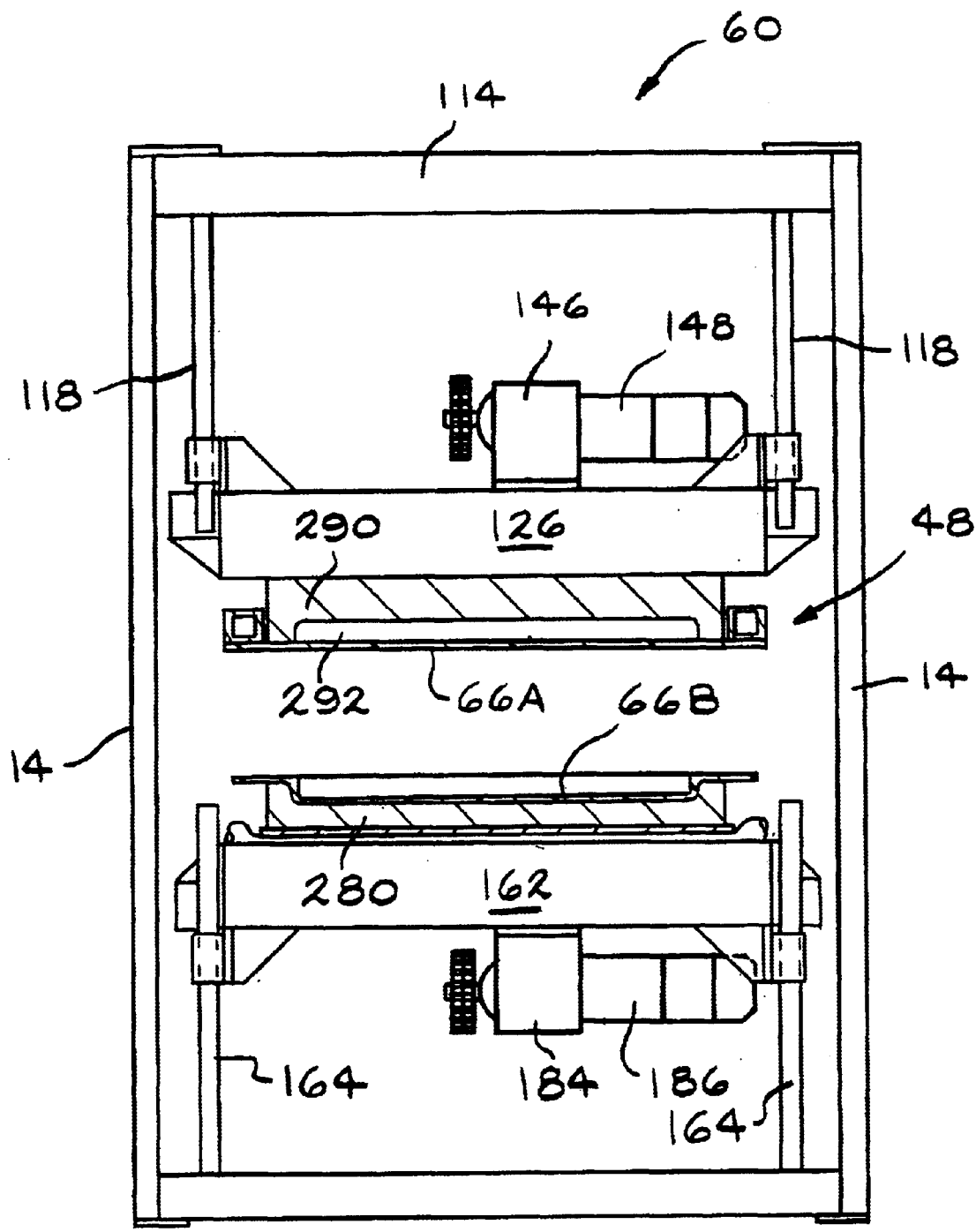
FIG. 14 is a front, elevational view of the thermoforming station of six station rotary thermoforming machine according to the present invention with a top panel loaded onto a top mold section.
Figure 15:
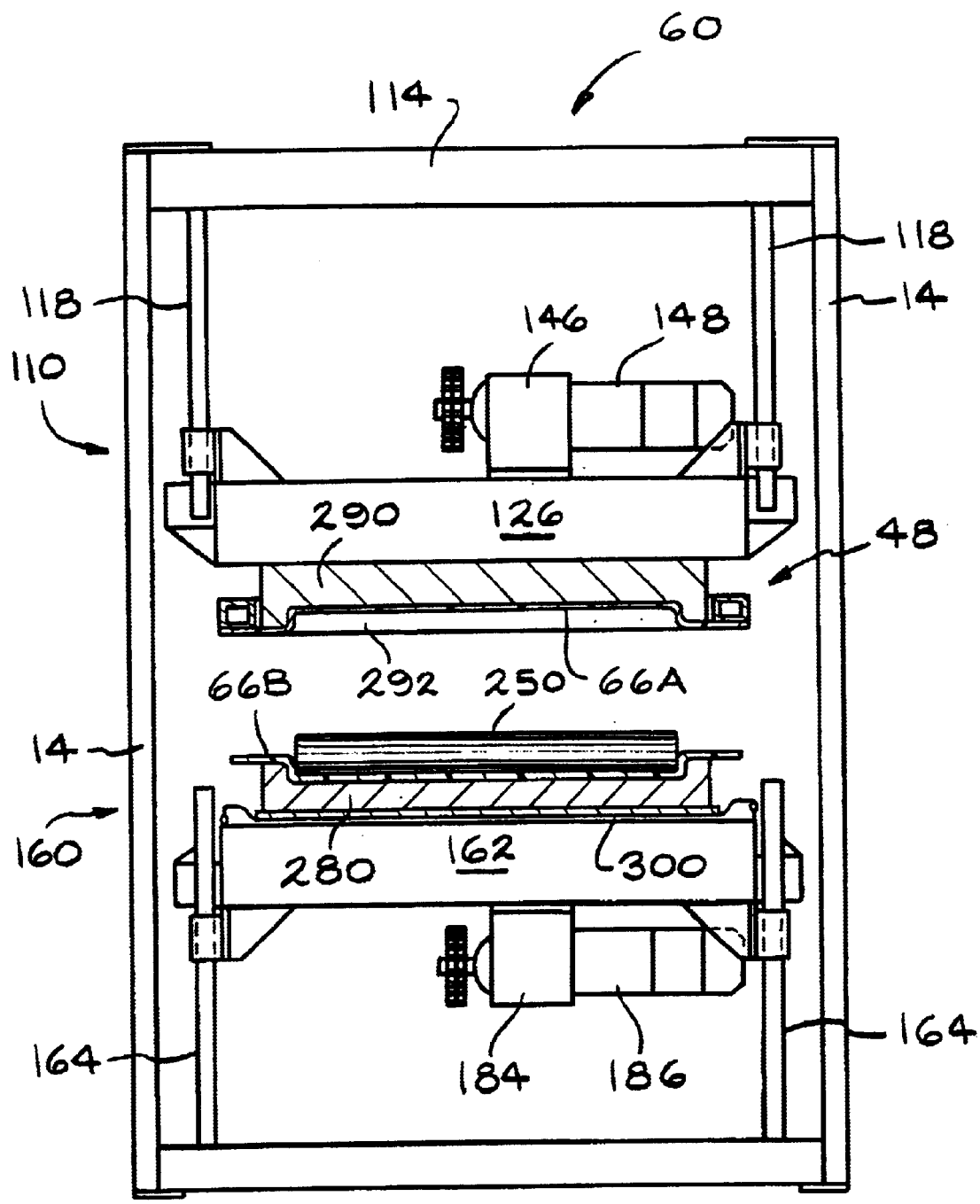
FIG. 15 is a front, elevational view of the thermoforming station of six station rotary thermoforming machine according to the present invention with a top panel formed in the top mold section and a reinforcing core disposed in the bottom panel in the lower mold section.

Turning now to FIGS. 14 and 15, the electric drive motor 186 is then activated to lower the lower platen 162 preparatory to activating the electric motor 40 to cause another 60° step of indexed rotation of the carousel assembly 18. Such indexed rotation of the carousel assembly 18 then provides and aligns the upper thermoformable panel 66A with an upper vacuum mold 290 secured to and carried by the upper platen 126. In a fashion similar to the action of the lower mold assembly 160, the electric motor 148 is activated to lower the upper platen 126 and the upper mold 290 such that an upper mold cavity 292 is adjacent the upper thermoformable panel 66A. A vacuum is drawn within the upper mold cavity 292 and, as illustrated in FIG. 15, the upper thermoformable panel 66A conforms to the surface of the upper mold cavity 292.

Figure 16:
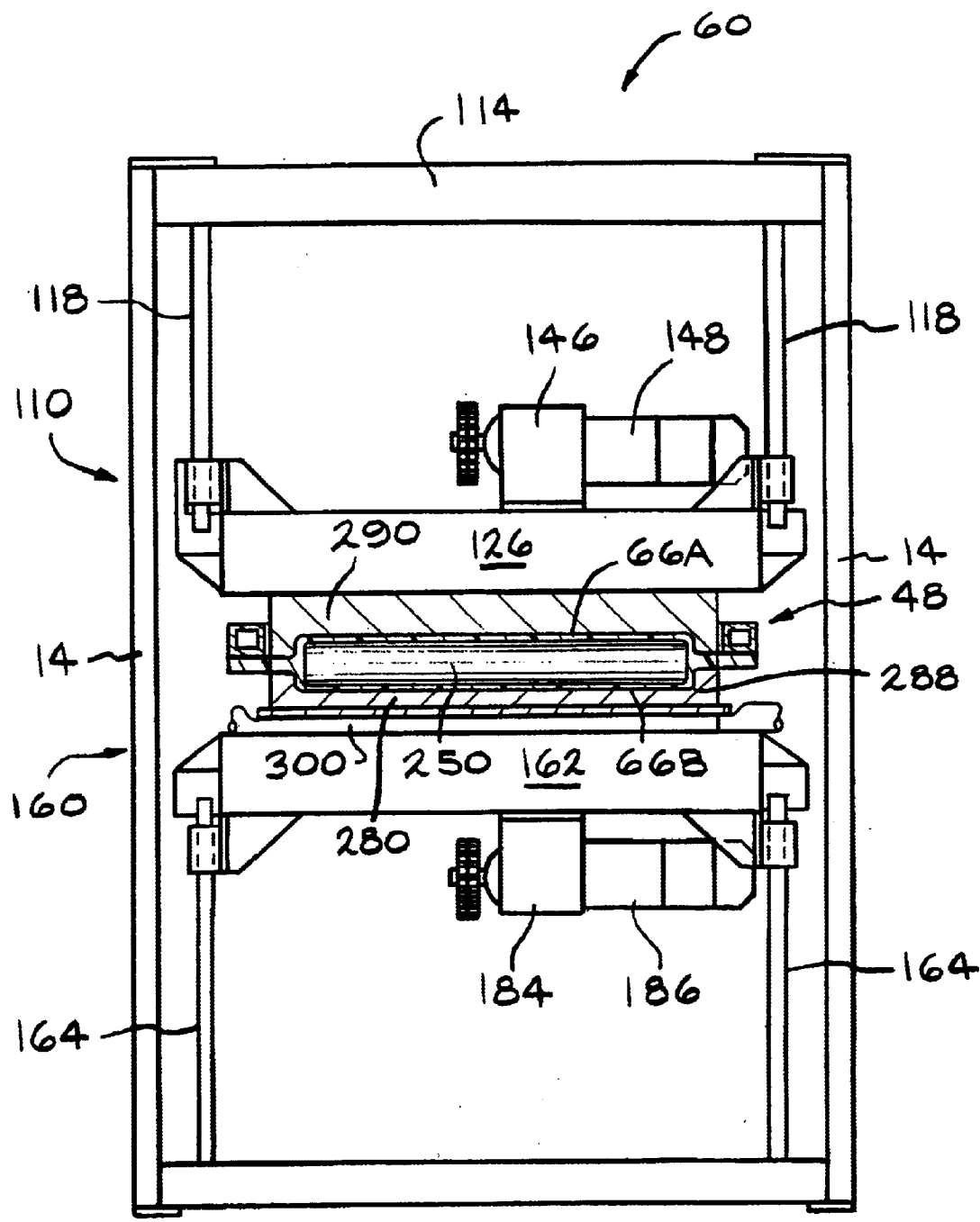
FIG. 16 is a front, elevational view of the thermoforming station of a six station rotary thermoforming machine according to the present invention illustrating a final thermoforming and sealing operation.

Next, and as illustrated in FIG. 16, or during this previously described activity, and as illustrated in FIGS. 10 and 15, the robot loading assembly 62 is activated to transfer a preform or insert 250 from the stack 252 into the interior of the lower thermoformable panel 66B. The preform or insert 250 may be selected from a wide variety of reinforcing materials and may be wood, aluminum, honeycomb, plastic foams and multilayer sandwiches of fibers or resin impregnated fibers and foam layers of polyurethane, polyethylene or Styrofoam, for example.

Next, the electric motor 186 is once again activated to raise the lower platen 162 and the associated lower mold 280 such that the opposing faces of the thermoformable panels 66A and 66B engage one another. The same raising of the lower platen 162 engages the bayonets 192 and the radially extending bayonet pins 212 into the passageways 218 and the bayonet lock passages 222. At this time, the piston and cylinder assemblies 210 are activated to rotate the bayonets 192 such that the bayonet pins 212 engage and lock in the bayonet lock passageways 222 thereby preventing relative vertical motion between the upper platen 126 and the lower platen 162. The upper thermoformable panel 66A and the lower thermoformable panel 66B and the insert or perform 250 are secured together within the molds 280 and 290 by compressive force generated by a plurality of air bladders 300 disposed between the lower platen 162 and the lower mold 280. The air bladders 300 preferably occupy substantially the entire lower surface of the lower platen 126 and are filled with compressed air at a pressure of at least about 100 p.s.i. Significant compressive force, on the order of 75 to 100 tons or more depending upon the air pressure and surface areas of the bladders 300 and the lower platen 162, is typically generated and applied to the molds 280 and 290.

Upon completion of the forming and sealing steps wherein the peripheries of the thermoformable panels. 66A and 668 are secured together, air pressure within the bladders 300 is released, the piston and cylinder assemblies 210 are activated in the reverse direction such that the bayonet pins 212 release from the bayonet lock passages 222. Then the electric drive motors 148 and 186 are activated to raise and lower, respectively, the upper platen 126 and associated upper mold 290 and the lower platen 162 and the associated lower mold 280.

Once again and as illustrated in FIGS. 1 and 11, the electric drive motor 40 is activated and indexes the carousel assembly 18 another 60° such that the formed product 266 is now aligned with the unloading station 64. At this time, the product 266 is released from the carrier frame 48 by deactivating the piston and cylinder assemblies 84 and releasing the pivoting clamps 86. The formed product 266 then drops and is engaged by the table 256 which has been elevated to a position directly underneath the product 266 such that it does not drop a significant distance. The drive actuator 260 is then activated to lower the table 256 and the product 266. The tilt stop 264 engages the bottom of the table 256 tilting it and the product 266 slides onto the conveyor 270. The formed product 266 is then removed from the conveyor 270 such that final trimming and other post production processes may be completed prior to storage and shipment.

Although the foregoing description relates to the operation and sequencing of two adjacent carrier frames 48 as they receive the upper and lower thermoformable panels 66A and 66B, are heated in the adjacent heating stations 54 and 56, are formed and combined into the completed product 266 in the forming station 60 and finally unloaded from the rotary thermoforming machine 10 at the unloading station 64, it should be appreciated that the upper and lower thermoformable panels 66A and 66B are continuously and alternately loaded into the carrier frames 48 such that a formed product 266 is produced upon or after every two indexed cycles, i.e., 120° of rotation, of the carousel assembly 18.

The foregoing disclosure is the best mode devised by the inventors for practicing this invention. It is apparent, however, that apparatus and methods incorporating modifications and variations will be obvious to one skilled in the art of rotary thermoforming machines. Inasmuch as the foregoing disclosure presents the best mode contemplated by the inventors for carrying out the invention and is Intended to enable any person skilled in the pertinent art to practice this invention, it should not be construed to be limited thereby but should be construed to include such aforementioned obvious variations and be limited only by the spirit and scope of the following claims.

I claim:

1. A six station rotary thermoforming machine comprising, in combination, a carousel assembly having six panel carrying frames, a first unheated loading station for loading first thermoformable panels having a face into every one of said six panel carrying frames, a second loading station disposed adjacent said first loading station for loading second thermoformable panels having a face, a first heating station disposed adjacent said second loading station for heating said panels, a second heating station for heating said panels, a thermoforming station comprising a first platen adapted to receive a first mold section for molding said first thermoformable panel and a second platen adapted to receive a second mold section for molding said second thermoformable panel, said first and second platens being opposed and translatable to engage said faces of said first thermoformable panel and said second thermoformable panel, said thermoforming station further comprising a loading assembly adapted to position an insert between said thermoformable panels, an unloading station disposed adjacent said first unheated loading station.

2. The rotary thermoforming machine of claim 1 further including a drive assembly adapted to intermittently rotate said carousel assembly.

3. The rotary thermoforming machine of claim 1 further including a sensor disposed adjacent said at least one heating station for sensing sag of said thermoformable panels.

4. The rotary thermoforming machine of claim 1 wherein said loading stations include suction lift cups.

5. The rotary thermoforming machine of claim 1 wherein said thermoforming station further includes drive means for raising and lowering said platens and locking means for securing said platens together.

6. The rotary thermoforming machine of claim 5 wherein said drive means includes a plurality of stationary gear racks received within bushings and engaged by spur gear driven by a motor drive assembly.

7. The rotary thermoforming machine of claim 5 wherein said locking means includes a plurality of bayonets having bayonet pins disposed for motion with one of said platens and a plurality of bayonet sockets disposed for motion with another of said platens.

8. The rotary thermoforming station of claim 1 further including bladders disposed between one of said mold sections and one of said platens.

9. A six station rotary thermoforming machine comprising, in combination, a carousel having six panel receiving frames, a first unheated loading station for loading first thermoformable panels into said frames, a second loading station disposed adjacent said first loading station for loading second thermoformable panels into said frames, a first heating station disposed adjacent said second loading station for heating said thermoformable panels, a second heating station for heating said thermoformable panels, a thermoforming station having a first mold section for molding said first thermoformable panels and a second mold section for molding said second thermoformable panels, said first and second mold sections being vertically translatable to engage, opposing faces of said first and second thermoformable panels, said thermoforming station further comprising an insert loading assembly for positioning an insert between said thermoformable panels, and an unloading station adjacent said first unheated loading station, wherein said carousel assembly transfers such thermoformable panels between such stations.

10. The rotary thermoforming machine of claim 9 wherein said thermoforming station further includes drive means for raising and lowering said platens and locking means for securing said platens together.

11. The rotary thermoforming machine of claim 10 wherein said drive means includes a plurality of stationary gear racks received within bushings and engaged by spur gear driven by a motor drive assembly.

12. The rotary thermoforming machine of claim 10 wherein said locking means includes a plurality of bayonets having bayonet pins disposed for vertical translation with one of said platens and a plurality of bayonet sockets disposed for vertical translation with another of said platens.

13. The rotary thermoforming machine of claim 9 further including a drive assembly adapted to intermittently rotate said carousel.

14. The rotary thermoforming machine of claim 9 further including a sensor disposed adjacent said at least one heating station for sensing sag of said thermoformable panels.

15. The rotary thermoforming machine of claim 9 wherein said carousel frames include clamp members adapted to engage said thermoformable panels and actuators coupled to said clamp members.

16. The rotary thermoforming machine of claim 9 wherein said first thermoformable panels have distinct surface features from said second thermoformable panels.

17. A six station rotary thermoforming machine comprising, in combination, a carousel having six panel receiving frames, a drive assembly adapted to rotate said carousel, a first unheated loading station for loading first thermoformable panels into said carousel frames, a second loading station disposed adjacent said first loading station for loading second thermoformable panels into said carousel frames, a first heating station disposed adjacent said second loading station for heating said thermoformable panels, a second heating station for heating said thermoformable panels, a thermoforming station having a first mold section for molding said first thermoformable panels and a second mold section for molding said second thermoformable panels, said first and second mold sections being vertically translatable to engage opposing faces of said first and second thermoformable panels, an insert loading assembly at said thermoforming station for positioning an insert between said thermoformable panels during thermoforming, and an unloading station disposed adjacent said first unheated loading station, wherein said carousel assembly transfers such thermoformable panels between such stations.

18. The rotary thermoforming machine of claim 17 further including a sensor disposed adjacent said at least one heating station for sensing sag of said thermoformable panels.

19. The rotary thermoforming machine of claim 17 further including a plurality of air bladders disposed between one of said mold sections and one of said platens.

20. The rotary thermoforming machine of claim 17 wherein said thermoforming station further includes drive means for raising and lowering said platens and locking means for securing said platens together.

21. The rotary thermoforming machine of claim 20 wherein said drive means includes a plurality of stationary gear racks received within bushings and engaged by spur gear driven by a motor drive assembly.

22. The rotary thermoforming machine of claim 20 wherein said locking means includes a plurality of bayonets having, bayonet pins disposed for vertical translation with one of said platens and a plurality of bayonet sockets disposed for vertical translation with another of said platens.

* * * * *